United States Patent
Majidi et al.

(10) Patent No.: US 7,799,423 B2
(45) Date of Patent: Sep. 21, 2010

(54) NANOSTRUCTURED FRICTION ENHANCEMENT USING FABRICATED MICROSTRUCTURE

(75) Inventors: Carmel Majidi, Berkeley, CA (US); Richard Groff, Berkeley, CA (US); Ronald S. Fearing, Orinda, CA (US)

(73) Assignee: The Regents of the University of California, Oakland, CA (US)

( * ) Notice: Subject to any disclaimer, the term of this patent is extended or adjusted under 35 U.S.C. 154(b) by 423 days.

(21) Appl. No.: 11/281,768

(22) Filed: Nov. 16, 2005

(65) Prior Publication Data

US 2006/0202355 A1   Sep. 14, 2006

Related U.S. Application Data

(60) Provisional application No. 60/629,799, filed on Nov. 19, 2004.

(51) Int. Cl.
  *B32B 7/12*   (2006.01)
(52) U.S. Cl. .................. 428/343; 428/357; 428/364
(58) Field of Classification Search ............... 428/357, 428/364, 343
  See application file for complete search history.

(56) References Cited

U.S. PATENT DOCUMENTS

| | | |
|---|---|---|
| 4,545,831 A | 10/1985 | Ornstein |
| 4,704,745 A | 11/1987 | Reaver |
| 5,077,870 A | 1/1992 | Melbye et al. |
| 5,264,722 A | 11/1993 | Tonucci et al. |
| 5,392,498 A | 2/1995 | Goulait et al. |
| 5,843,657 A | 12/1998 | Liotta et al. |
| 5,843,767 A | 12/1998 | Beattie |
| 5,951,931 A | 9/1999 | Murasaki et al. |
| 5,959,200 A | 9/1999 | Chui et al. |
| 6,055,680 A | 5/2000 | Tolbert |
| 6,372,364 B1 | 4/2002 | Hunt et al. |
| 6,393,327 B1 | 5/2002 | Scribner |

(Continued)

FOREIGN PATENT DOCUMENTS

JP   2002-307398   10/2002

(Continued)

OTHER PUBLICATIONS

International Search Report and Written Opinion mailed Oct. 1, 2007, for PCT Application No. PCT/US05/42224 filed Nov. 17, 2005, 8 pages.

(Continued)

*Primary Examiner*—D. Lawrence Tarazano
*Assistant Examiner*—Matthew D Matzek
(74) *Attorney, Agent, or Firm*—Morrison & Foerster LLP (57) ABSTRACT

Described herein are fabricated microstructures to adhere in shear to a contact surface. A fabricated microstructure comprises a substrate and a plurality of nano-fibers attached to the substrate. The nano-fibers have an elasticity modulus E, an interfacial energy per unit length of contact w, a length L, a radius R, and are oriented at an angle $\theta_o$ relative to the substrate. The length L of the nano-fibers is greater than $0.627\theta_o R^2(E/w)^{1/2}$ with $\theta_o$ in radians. Also described herein is a method of forming a fabricated microstructure to adhere in shear to a contact surface and a method of adhering in shear a fabricated microstructure to a contact surface.

15 Claims, 4 Drawing Sheets

U.S. PATENT DOCUMENTS

| | | | |
|---|---|---|---|
| 6,713,151 | B1 | 3/2004 | Dean et al. |
| 6,722,026 | B1 | 4/2004 | Lent |
| 6,737,160 | B1 | 5/2004 | Full et al. |
| 6,838,150 | B2 | 1/2005 | Mazurek et al. |
| 6,872,439 | B2 | 3/2005 | Fearing et al. |
| 2002/0100581 | A1 | 8/2002 | Knowles et al. |
| 2003/0124312 | A1 | 7/2003 | Autumn |
| 2004/0005454 | A1 | 1/2004 | Full et al. |
| 2004/0009353 | A1 | 1/2004 | Knowles et al. |
| 2004/0071870 | A1 | 4/2004 | Knowles et al. |
| 2004/0076822 | A1 | 4/2004 | Jagota et al. |
| 2004/0206448 | A1* | 10/2004 | Dubrow ................. 156/276 |
| 2005/0072509 | A1 | 4/2005 | Full et al. |
| 2005/0181170 | A1 | 8/2005 | Fearing et al. |

FOREIGN PATENT DOCUMENTS

| | | |
|---|---|---|
| WO | WO-99/32005 | 7/1999 |
| WO | WO-01/49776 | 7/2001 |
| WO | WO-03/095190 | 11/2003 |
| WO | WO 2005/033237 | 4/2005 |

OTHER PUBLICATIONS

Shah, G. J. et al. (Aug. 2004). "Modeling and Design of Biomimetic Adhesives Inspired by Gecko Foot-Hairs," *IEEE International Conference on Robotics and Biomimetics*, pp. 1-6, located at <http://www.andrew.cmu.edu/user/gshah/publications/Gaurav_robio_submit.pdf>.

Pursel, S. et al. (2005). "Growth of Sculptured Polymer Submicronwire Assemblies by Vapor Deposition," Polymer 46:9544-9548.

Supplemental European Search Report mailed Nov. 3, 2004, for European Application No. 00993217.9 filed Dec. 11, 2000, 3 pages.

Autumn, Kellar et al., (Jun. 8, 2000) "Adhesive force of a single gecko foot-hair," Nature, 405: 681-658.

Cartmill, Matt (1985) "Chapter 5: Climbing," in *Functional Vertebrate Morphology*, M. Hildebrand et al. eds., Belknap Press of Harvard University Press, Cambridge, MA, pp. 73-88.

Edwards, John S. (Oct. 1962) "Observations on the development and predatory habit of two *Reduviid heteroptera, phinocoris Carmelita stal* and *Platymeris rhadamanthus* gerst," Proc. R. Ent. Soc. Lond., 37(7-9): 89-98.

Edwards, John S. et al., (1970) "The adhesive pads of Heteroptera: a re-examination," Proc. R. ent. Socl. Lond. 45(1-3): 1-5.

Fearing et al., pending U.S. Appl. No. 11/143,372, filed Jun. 1, 2005.

Geim, A.K. et al., (Jul. 2003) "Microfabricated adhesive mimicking gecko foot-hair," Nature Materials, 2: 461-463.

Hora, Sunder Lal (1923) "The Adhesive Apparatus on the Toes of certain Geckos and Tree-frogs," Journal of the Asiatic Society of Bengal 9: 137-145.

Irschick, Duncan J. et al., (1996) "A comparative analysis of clinging ability among pad-bearing lizards," Biological Journal of the Linnean Society, 59: 21-35.

Jagota, Anand et al., (2002) "Mechanics of Adhesion Through a Fibrillar Microstructure," Integr. Comp. Biol., 42: 1140-1145.

Janra (Oct. 18, 2002) "Gecko feet in-hair-ently sticky (Science)," <http://www.kuro5shin.org/?op=displaystory;sid=2002/10/18/03840/816>, printed Nov. 17, 2005, 12 pages.

Liang, Yiching A. et al., (Jun. 2000) "Adhesion Force Measurements on Single Gecko Setae," Technical Digest of the 2000 Solid-State Sensor and Actuator Workshop, Jun. 4-8, 2000, Hilton Head Island, SC, pp. 33-38.

Maderson, P. F. A. (Aug. 15, 1964) "Keratinized Epidermal Derivatives as an Aid to Climbing in Gekkonid Lizards," Nature, 203: 780-781.

Mahendra, Beni Charan, (1941) "Contributions to the Bionomics, Anatomy, Reproduction and Development of the Indian House-Gecko, *Hemidactylus flaviviridis* Ruppel," Proceedings of the Indian Academy of Science, 13(5) Sec. B: 288-306.

Paul, Robert C. et al., (Oct. 21, 1999) "How do flies and other insects walk up walls, ceilings and even apparently smooth glass windows?" <http://www.sciam.com/askexpert_question.cfm?articleID=00053735-601D-1C72-9EB7809EC588F2D7>, 2 pages.

Peterson, J. A. et al., (Jul. 21, 1981) "A case study in retrograde evolution: the *onca* lineage in anoline lizards. II. Subdigital fine structure," Bulletin of the Museum of Comparative Zoology, 149(4): 215-268.

Ruibal, Rodolfo et al., (Nov. 1965) "The Structure of the digital Setae of Lizards," Journal of Morphology, 117: 271-294.

Russell, Anthony P. (1975) "Contribution to the functional analysis of the foot of the Tokay, *Gekko gecko* (Reptilia: Gekkonidae)," Zool. Lond., 176: 437-476.

Sitti, Metin et al., (Sep. 2002) "Synthetic Gecko Foot-Hair Micro/Nano-Structures for Future Wall-Climbing Robots," Proceedings of the IEEE International Conference on Robotics and Automation, ICRA 2003, Sep. 14-19, 2003, Taipei, Taiwan, 7 pages.

Spice, (Jul. 7, 2003) "Scientists unravel mystery of gecko's sticky feet," post-gazette.com Health & Science, <http://web.archive.org/web/20030709183536/http://www.post-gazette.com/healthscience/...>, printed Nov. 17, 2005, 6 pages.

Stork, N. E. (Oct. 1980) "Experimental analysis of adhesion of *Chrysolina polita* (Chrysomelidae: Coleoptera) on a variety of surfaces," J. exp. Biol., 88: 91-107.

Stork, N. E., (Mar. 1980) "A scanning electron microscope study of tarsal adhesive setae in the Coleoptera" Zoological Journal of the Linnean Society, 68: 173-306.

Thurn-Albrecht, T. et al., (Dec. 15, 2000) "Ultrahigh-Density Nanowire Arrays Grown in Self-Assembled Diblock Copolymer Templates," Science, 290: 2126-2129.

Williams, E. E. (Mar. 19, 1982) "Convergent and Alternative Designs in the Digital Adhesive Pads of Scincid Lizards," Science, 215: 1509-1511.

* cited by examiner

NANOSTRUCTURED FRICTION ENHANCEMENT USING FABRICATED MICROSTRUCTURE

CROSS-REFERENCE TO RELATED APPLICATIONS

This application claims the benefit under 35 USC 119(e) of U.S. Provisional Application No. 60/629,799, filed Nov. 19, 2004, which is incorporated in its entirety herein by reference.

STATEMENT REGARDING FEDERALLY SPONSORED RESEARCH OR DEVELOPMENT

This invention was made with Government support under Grant (contract) No. NMA 501-03-1-2017 awarded by the National Imagery and Mapping Agency and No. EEC-0304 730 awarded by the National Science Foundation. The Government has certain rights in this invention.

BACKGROUND

1. Field

This application generally relates to the fabrication and utilization of micron-scale structures. More particularly, this application relates to nanostructured friction enhancement using a fabricated nanostructure.

2. Related Art

There is an ongoing need for improved adhesives. Improved adhesives have applications ranging from everyday aspects of life (e.g., tape, fasteners, and toys) to high technology (e.g., removal of microscopic particles from semiconductor wafers, transporting fiber optic devices, and assembly of sub-mm mechanisms, particularly those including micro-fabricated components, or components that cannot tolerate grippers, adhesives, or vacuum manipulators).

Adhesive mechanisms in nature have been studied, but have not been fully understood or exploited. For example, Geckos are exceptional in their ability to rapidly climb up smooth vertical surfaces. The mechanism of adhesion used by Geckos, Anolis lizards, some skinks, and some insects, has been debated for nearly a century.

SUMMARY

Biological nanohair adhesive systems, found, for example, in geckos, feature setae (hairs) with a hierarchical branching structure terminating in small, flat plates, called spatulae. Gecko setae observed in nature are not found in a clumped state, i.e., stuck to one another. Adhesive nano-fibers inspired by these biological examples have traditionally been designed to avoid clumping of the hairs. Previous work provides necessary conditions on hair geometry to avoid clumping, for example 1) under the assumption that a spatula at the end of the hair is capable of providing up to some fixed maximum force (see, Metin Sitti and Ronald S. Fearing, Synthetic Gecko Foot-Hair Micro/Nano-Structures for Future Wall-Climbing Robots, IEEE International Conference on Robotics and Automation, September 2002, which is incorporated herein by reference in its entirety) or 2) under the assumption that hairs stick along their length due to surface forces (see, A. Jagota and S. Bennison, Mechanics and Adhesion through a Fibrillar Microstructure, Integrative and Comparative Biology, 42:1140-1145, 2002, which is incorporated herein by reference in its entirety). Engineered nano-fiber systems (see, A. K. Geim, et al. Microfabricating adhesive mimicking gecko foot-hair, Nature Materials 2, pp 461-463, Jun. 1, 2003, which is incorporated herein by reference in its entirety) have expressly avoided configurations in which hairs clump, choosing instead to employ short, fat hairs. In Geim, for example, the hairs are 0.5 μm in diameter, 2 μm long with centers spaced 1.6 μm apart.

Described herein are fabricated microstructures to adhere in shear to a contact surface. A fabricated microstructure comprises a substrate and a plurality of nano-fibers attached to the substrate. The nano-fibers have an elasticity modulus E, an interfacial energy per unit length of contact w, a length L, a radius R, and are oriented at an angle $\theta_o$ relative to the substrate. The length L of the nano-fibers is greater than $0.627\theta_o R^2 (E/w)^{1/2}$ with $\theta_o$ in radians.

Also described herein is a method of forming a fabricated microstructure to adhere in shear to a contact surface. The method comprises forming a substrate and forming a plurality of nano-fibers attached to the substrate. The nano-fibers can have an elasticity modulus E, an interfacial energy per unit length of contact w, a length L, a radius R, and can be oriented at an angle $\theta_o$ relative to the substrate. The length L of the nano-fibers can be greater than $0.627\theta_o R^2 (E/w)^{1/2}$ with $\theta_o$ in radians.

Also described herein is a method of adhering in shear a fabricated microstructure to a contact surface. The method comprises obtaining a substrate having a plurality of nano-fibers attached to the substrate and placing the substrate on the contact surface. The nano-fibers can have an elasticity modulus E, an interfacial energy per unit length of contact w, a length L, a radius R, and can be oriented at an angle $\theta_o$ relative to the substrate. The length L of the nano-fibers can be greater than $0.627\theta_o R^2 (E/w)^{1/2}$ with $\theta_o$ in radians.

DETAILED DESCRIPTION

Figure 1:
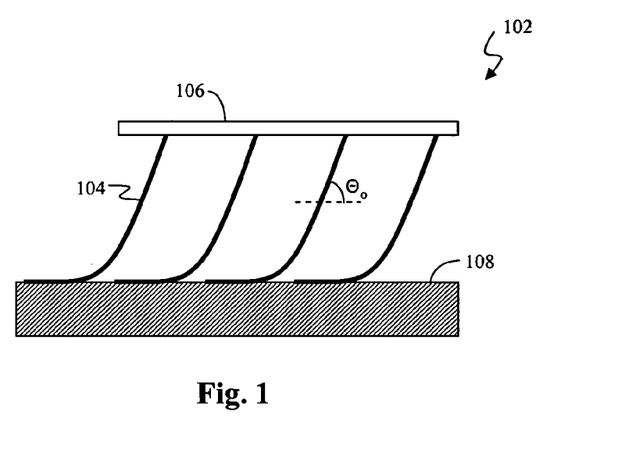
FIG. 1 illustrates a fabricated microstructure array to adhere in shear to a contact surface.

With reference to FIG. 1, in one exemplary embodiment, a fabricated microstructure array 102 to adhere in shear to a contact surface 108 is depicted. In the present exemplary embodiment, array 102 includes a plurality of nano-fibers 104 attached to a substrate 106. In the present exemplary embodiment, nano-fibers 104 have an elasticity modulus E, an interfacial energy per unit length of contact w, a length L, and a radius R. To improve adhesion to contact surface 108, nano-fibers 104 are biased at an angle $\theta_o$ relative to substrate 106 (see, U.S. patent application Ser. No. 10/197,763, titled ADHESIVE MICROSTRUCTURE AND METHOS OF FORMING SAME, filed on Jul. 17, 2002, which is incorporated herein by reference in its entirety).

In the present exemplary embodiment, nano-fibers 104 have a high aspect ratio (ratio of length L to radius R). In particular, length L of nano-fibers 104 is greater than $0.627\theta_o R^2(E/w)^{1/2}$ with $\theta_o$ in radians. The high aspect ratio of nano-fibers 104 allows the ends of nano-fibers 104 to bend to come in intimate contact with contact surface 108 without storing enough elastic strain energy to cause the ends to spring off contact surface 108. To prevent spring back even further, the ends of nano-fibers 104 can be pre-bent, for example by plastic deformation. In this manner, the ends of nano-fibers 104 with a high aspect ratio act as spatulas without requiring specially formed spatular structures. In one exemplary embodiment, nano-fibers 104 can provide adhesion with a ratio between shear force and normal force of 300 to 1.

In the present exemplary embodiment, nano-fibers 104 are disposed on substrate 106 with a high packing density. In particular, nano-fibers 104 are disposed on substrate 106 with a linear spacing greater than $0.188(L/R)^2(w/E)^{1/2}$. Alternatively, the linear spacing can be greater than $0.445(L/W)^2(w/E)^{1/2}$, which allows formation of small clumps. Due to surface forces (van der Waals or capillary action), an individual nano-fiber 104 with a high aspect ratio, though able to support its own weight, may easily become attached to substrate 106. The high packing density allows nano-fibers 104 to form clumps, which allows individual nano-fibers 104 to mutually support each other. Preload forces can supply enough energy to break apart the clumps and allow nano-fibers 104 to come into contact with contact surface 108 to which array 102 is being applied. It should be recognized that there are design tradeoffs in the aspect ratio of nano-fibers 104 (higher ratios allow nano-fibers 104 to conform to surfaces better, but form bigger clumps) and clump size (bigger clumps keep more nano-fibers 104 supported, but require more energy to break apart to achieve contact with contact surface 108).

In the present exemplary embodiment, nano-fibers 104 are disposed on substrate 106 in a square-lattice configuration. As will be described in more detail below, disposing nano-fibers 104 on substrate 106 using a square-lattice configuration allows interaction between clumps of nano-fibers 104 and contact surface 108 to more easily break up the clumps and allow nano-fibers 104 to adhere to contact surface 108.

Figure 2:
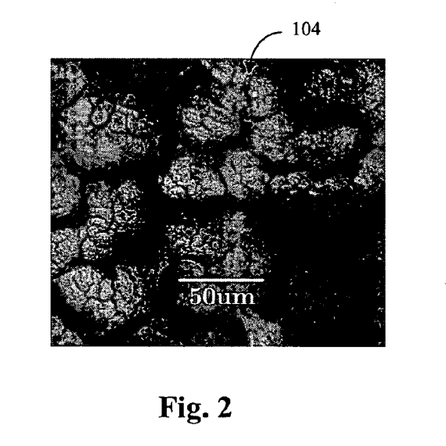
FIG. 2 illustrates clumps of epoxy nano-fibers approximately arranged in a hex-lattice configuration.
Figure 3:
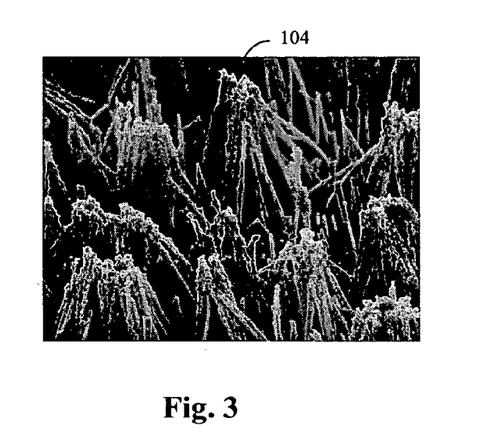
FIG. 3 illustrates clumps of polyimide nano-fibers arranged in an irregular-lattice configuration.

For example, with reference to FIG. 2, clumps of epoxy nano-fibers 104 are depicted that are 0.2 microns in diameter, 60 microns in length, with centers spaced 0.3 microns apart in an approximately hex-lattice configuration. With reference to FIG. 3, clumps of polyimide nano-fibers 104 are depicted that are 0.6 microns in diameter, 20 um in length, with centers approximately 1.8 microns in an irregular-lattice configuration.

I. Adhesion Force of Nano-Fibers

Figure 4:
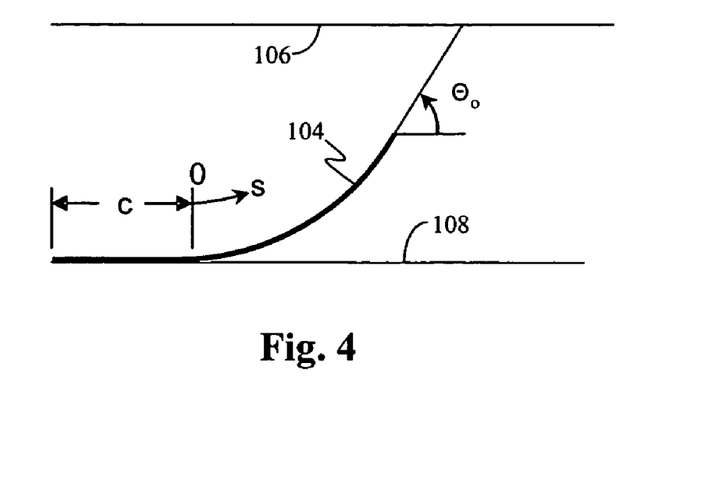
FIG. 4 illustrates that when a nano-fiber adheres in shear to a contact surface, a portion of the length of the nano-fiber makes contact with the contact surface.

With reference to FIG. 4, when a nano-fiber 104 adheres in shear to contact surface 108, a portion of the length of nano-fiber 104 makes contact with contact surface 108. As demonstrated in the following analysis, nano-fiber 104 must be sufficiently slender (high aspect ratio) in order for such a configuration to be mechanically stable under external loading. In addition, nano-fiber 104 can be fabricated with a curve at the end to reduce elastic bending energy required to make side contact with substrate 106, and increase stability.

A. Peel Strength

As depicted in FIG. 4, when nano-fiber 104 adheres in shear to contact surface 108, nano-fiber 104 is oriented an angle $\theta_o$ with respect to contact surface 108, and makes contact with contact surface 108 over a length L−a, such that a is the length of the unattached portion of nano-fiber 104. For a normal pull-off load P acting at the base of nano-fibers 104, the total potential energy of the system is:

$$U_t = wa + \int_0^a \frac{EI}{2}(\theta')^2 ds - \int_0^a P\sin(\theta) ds \qquad (1)$$

where, $\theta(s)$ is the slope of nano-fiber 104 at a distance s from contact, E is the elastic modulus, I is the area moment of inertia, and w is the interfacial energy per unit length of contact.

At equilibrium, the total potential is minimum with respect to the configuration variable a and the function $\theta(s)$. Assuming that $\theta_o$ is sufficiently small such that $\sin\theta \approx \theta$, equation (1) simplifies to:

$$U_t \approx wa + \int_0^a \left[\frac{EI}{2}(\theta')^2 - P\theta\right] ds. \qquad (2)$$

The integral is minimized with respect to $\theta(s)$ if the integrand, defined as $F(s, \theta, \theta')$, satisfies the equation:

$$\frac{\partial F}{\partial \theta} - \frac{d}{ds}\frac{\partial F}{\partial \theta'} = 0. \qquad (3)$$

for the boundary conditions $\theta(0)=0$ and $\theta(a)=\theta_o$. (See, Lanczos, C, The Variational Principles of Mechanics, New York: Dover, pg. 60 (1970), which is incorporated herein by reference in its entirety.) Solving the resulting ODE for $\theta(s)$ and substituting this into equation (2) gives an expression for $U_t$ only in terms of the length a. Lastly, setting $\partial U_t/\partial a = 0$, it follows that at equilibrium:

$$P = \frac{2}{a^2}(a\sqrt{2EIw} - EI\theta_o), \qquad (4)$$

which is largest when $a = \theta_o\sqrt{2EI/w}$. Hence, the maximum allowable pull-off force (i.e., peel strength) is:

$$T = \begin{cases} w/\theta_o & \text{if } L \geq \theta_o\sqrt{2EI/w} \\ \frac{2}{L^2}(L\sqrt{2EIw} - EI\theta_o) & \text{otherwise} \end{cases} \qquad (5)$$

B. Shear Strength

If only a shear force, V, is applied, then bond failure is more likely to depend on strain energy stored in elongation of nano-fiber 104 rather than bending. If, under the presence of a constant V, the length of the unattached portion of nano-fiber 104 increases by an infinitesimally small amount δa, the potential energy changes by an amount:

$$\delta U_t = w\delta a + \frac{1}{2E}\left(\frac{V}{A}\right)^2 A\delta a - V\left(\frac{V}{EA}\right)\delta a \qquad (6)$$

where the first term represents the increase in free surface energy, the second term is the increase in elastic strain energy, and the final term follows from the work of the external shear load.

Since $U_t$ is minimized at equilibrium, $\delta U_t=0$, which implies that:

$$V=\sqrt{2EAw} \qquad (7)$$

Figure 5:
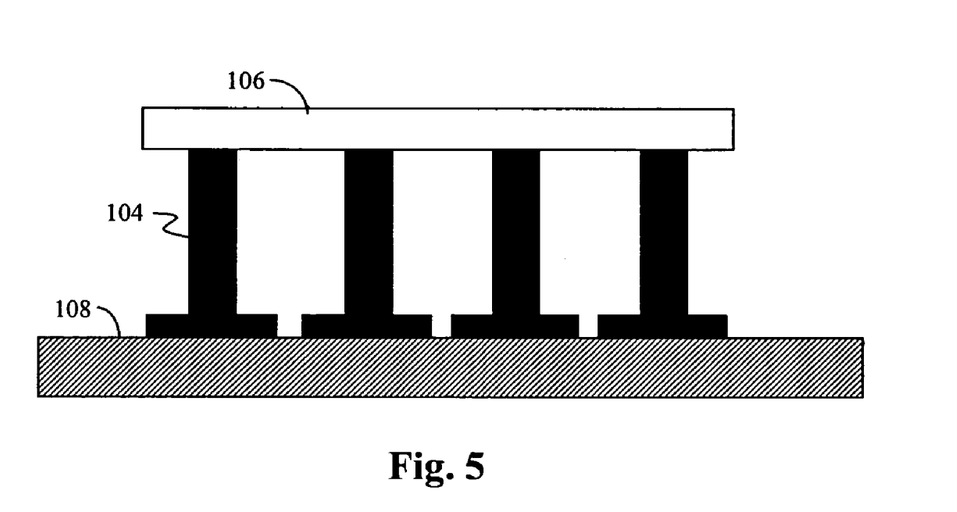
FIG. 5 illustrates an embodiment of the fabricated microstructure where the tip geometry of the nano-fiber is a T-shaped terminal.

Approximating $T \approx (2/L)\sqrt{2EIw}$ and noting that $I=\pi R^4/4$ and $A=\pi R^2$, where R is the radius of nano-fiber 104, the ratio between the shear and peel strength is found to be equal to the aspect ratio L/R:1. This is a very large difference and for more slender nano-fibers 104 the ratio can be as high as 300:1. It should be noted that for tip geometries in which peeling is not permitted, such as a sphere or a T-shaped terminal (as depicted in FIG. 5), the shear to pull off ratio is greatly reduced to 0.1:1 or 1:1, depending on the magnitude of the friction coefficient.

C. Enhanced Friction

With reference to FIG. 1, assuming that stresses are uniformly distributed among nano-fibers 104, the shear resistance is $n\sqrt{2EAw}$, where n is the number of nano-fibers 104 in contact with contact surface 108. This assumes that nano-fibers 104 are being dragged parallel to their axis of contact. If nano-fibers 104 are pulled in a direction that is deflected from the contact axis by an angle α, then the necessary shear for peeling is better approximated by $\min\{\sqrt{2EAw}, w/(1-\cos\alpha)\}$.

According to equation (1), the stiffness, $EI/L^2$, of an individual nano-fiber 104 is less than $2w/\theta_o^2$ in order for it to be able to make contact along its side during pull-off. The critical buckling strength, however, is $\pi^2 EI/4L^2$, which implies that for compressive loads greater than $\pi^2 w/2\theta_0^2$, contact surface 108 will make direct contact with substrate 106. Noting that w is typically ~1 nN, under most finite compressive loads, sliding involves only contact surface 108 and substrate 106, in which case the frictional resistance is approximately μP, where μ is the coefficient of friction and P is the compressive load. Typically, μ is between 0.1 and 1.

Combining the two cases of zero and finite compressive load, array 102 follows Coulomb's law of friction:

$$V=\mu P + V_{ad} \qquad (8)$$

where μ is between 0.1 and 1 and the shear strength $V_{ad}$ is the sum of $$\min\{\sqrt{2EAw}, w/(1-\cos\alpha)\}$$

all nano-fibers 104 on array 102 in contact with contact surface 108. As P approaches zero, the value of V/P approaches infinity since $V_{ad}$ is finite.

II. Clump Size Prediction

Figure 6:
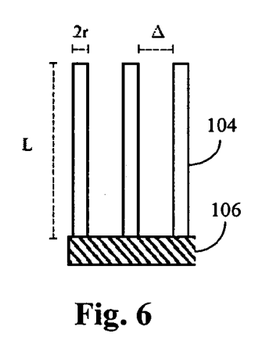
FIG. 6 illustrates nano-fibers disposed on a substrate at a certain distance from each another.

With reference to FIG. 6, nano-fibers 104 having length L and radius R are disposed on substrate 106, and are separated by a distance Δ from each other. Nano-fibers 104 can bind to each other rather than to contact surface 108. The distance Δ that adjacent nano-fibers 104 must be separated in order to avoid binding can be expressed in terms of the design parameters E, I, w, and L:

$$\Delta > \frac{L^2}{6}\sqrt{\frac{w}{EI}} = \frac{1}{3\sqrt{\pi}}\left(\frac{L}{R}\right)^2\sqrt{\frac{w}{E}} \approx 0.188\left(\frac{L}{R}\right)^2\sqrt{\frac{w}{E}}. \qquad (9)$$

With reference again to FIG. 1, in the absence of any external load, it follows from equation (1), with P=0, that side contact with contact surface 108 is only possible if:

$$L > \theta_o\sqrt{\frac{EI}{2w}} = \frac{\sqrt{\pi}}{2\sqrt{2}}\theta_0 R^2\sqrt{\frac{E}{w}} \approx 0.627\theta_0 R^2\sqrt{\frac{E}{w}}. \qquad (10)$$

This implies, then, that for a fixed stiffness, EI, nano-fibers 104 must be spaced at least a distance $(\theta_o^2/12)\sqrt{EI/w}$ apart. For $I=\pi R^4/4$, where R is the radius of nano-fibers 104, and assuming typical values of E=1 GPa and w=1 nN, the necessary spacing of nano-fibers 104 is on the order of $R^2/(0.01$ um). Hence, a suitable packing density can be achieved with nano-fibers 104 of radius 100 nm, whereas larger nano-fibers 104 with micron width would need to be exceedingly long for side contact with contact surface 108, and hence excessively sparse to avoid inter-fiber binding.

Treating a clump of nano-fibers 104 as a single large nano-fiber 104, it follows from linear beam theory that the strain energy for a clump of n nano-fibers 104 under a shear load V is $U_{el,1}=V^2L^3/6n^2EI$. If the outer ring of nano-fibers 104, which number $m=\pi\sqrt{n}$, detach from the clump, then the clump radius reduces to $(\sqrt{n}-2)R$, resulting in an area fraction of $A_c=(\sqrt{n}-2)^2/n$ for the entire array. The elastic energy, becomes:

$$U_{el,2} = (VA_c)^2\frac{L^3}{6EI}\frac{1}{\left(\sqrt{n}-2\right)^4} + m[V(1-A_c)]^2\frac{L^3}{6EI}, \qquad (11)$$

where the first term is the elastic energy of the clump and the second term is the sum of the elastic energy in the detached nano-fibers 104. Note that it is assumed here that the shear load V is uniformly distributed among the nano-fibers 104. Defining $W_{ad}$ to be the net change in surface energy for each of the circumferential nano-fibers 104 that binds to contact surface 108 after detaching from the clump, the change in total energy is approximately $\Delta U=U_{el,2}-U_{el,1}-mW_{ad}$. By the principle of least work, $\Delta U=0$ at equilibrium. Solving for V:

$$V = \frac{1}{2}\frac{n}{(\sqrt{n}-1)}\sqrt{\frac{3EIW_{ad}}{2L^3}} \approx \frac{1}{2}\sqrt{n\frac{3EIW_{ad}}{2L^3}}. \qquad (12)$$

This is the force needed to begin breaking the clump of nano-fibers 104. The necessary force increases with clump size, and so it is desirable for the clumps to be as small as possible.

Figure 7:
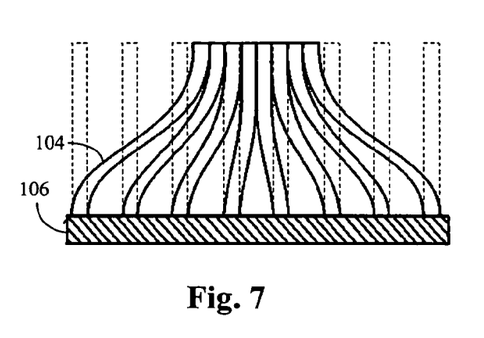
FIG. 7 illustrates a clump of nano-fibers.
Figure 8:
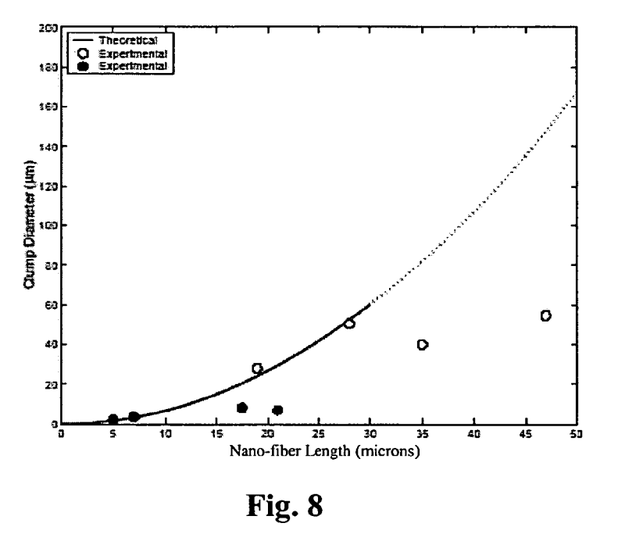
FIG. 8 illustrates theoretical and experimentally observed clump diameter as a function of nano-fiber length.

In the case that clumping does occur, the amount of nano-fibers 104 in each clump can be predicted for a specific geometry and spacing of nano-fibers 104. Assuming that nano-fibers 104 clump in the manner illustrated in FIG. 7:

$$w_p \approx 0.89 \frac{L^2}{R\Delta} \sqrt{\frac{w}{E}} \quad (13)$$

where $w_p$ is the width of the clump and $\gamma$ is the surface energy of the material. This model tends to overestimate observed clump size, as shown in FIG. 8, but serves as a useful tool for nano-fiber 104 design.

III. Lattice Structures

Figure 9A:
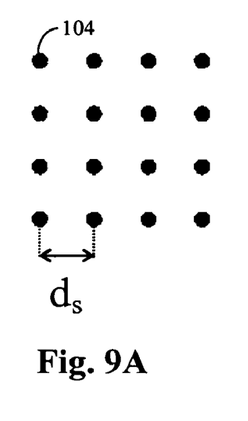
FIG. 9A illustrates a square lattice configuration.
Figure 9B:
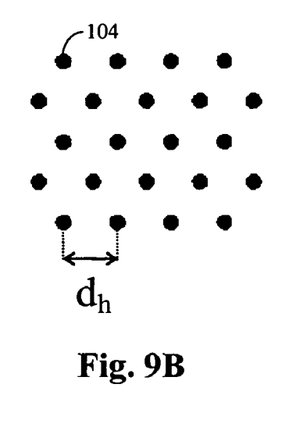
FIG. 9B illustrates a hexagonal lattice configuration.

Planar regular lattices can either be square (FIG. 9A) or hexagonal (FIG. 9B). With reference to FIG. 9A, in a square lattice, if the inter-fiber spacing is $d_s$, then the density (nano-fibers 104 per unit area) will be:

$$\rho = \frac{1}{d_s^2}. \quad (14)$$

With reference to FIG. 9B, in a hexagonal lattice with inter-fiber spacing $d_h$, then the density will be:

$$\rho = \frac{2\sqrt{3}}{3d_h^2}. \quad (15)$$

It follows that for equivalent densities, square packing will have smaller inter-fiber spacing than hexagonal packing. Specifically, choosing inter-fiber spacing of:

$$d_h = \sqrt{\frac{2\sqrt{3}}{3}} \, d_s \approx 1.075 d_s \quad (16)$$

provides equivalent densities for hexagonal and square lattices. Since adhesion forces are monotonic in the number of engaged nano-fibers 104, hexagonal packing would naively seem beneficial, since for a given inter-fiber spacing, more nano-fibers 104 can be packed into an area. Some analysis, however, demonstrates that square packing offers advantages over hexagonal packing with respect to the energy clumping.

In particular, with reference to FIGS. 9A and 9B, when a neighboring nano-fiber 104 joins the clump, the strain energy in that nano-fiber 104 increases. This strain energy is monotonic in distance, and is written as $E_{st}(d)$, where d is the distance the tip must move. For the present, consider $$E_{st}(d) = \frac{1}{2} k d^2,$$

though the argument holds for a more general class of strain energies (for example, if the strain energy is monotonic increasing and convex in d). For the square lattice (FIG. 9A), the total strain energy stored in the eight neighbors is:

$$E_{st,s} = 4E_{st}(d_s) + 4E_{st}(\sqrt{2}\,d_s) \quad (17)$$
$$= 6kd_s^2$$

while for the hexagonal lattice (FIG. 9B) the strain energy stored in the six neighbors is:

$$E_{st,h} = 6E_{st}(d_h) \quad (18)$$
$$= 2\sqrt{3}\,kd_s^2$$

In this region for both hexagonal and square packing, the number of contacts with other nano-fibers 104 in this small clump is 12. For now, assume that each of these contacts provides the same reduction in adhesive potential energy, $-E_{ad}$. (Actually, in the clumping model described herein, nano-fibers 104 that are farther away would have provided a smaller drop in adhesive potential energy, which would further benefit the square lattice configuration.) Thus, the total change in potential for square packing is:

$$E_s = 4E_{st}(d_s) + 4E_{st}(\sqrt{2}\,d_s) - 12E_{ad} \quad (19)$$
$$= 6kd_s^2 - 12E_{ad}$$

and for hexagonal packing is:

$$E_h = 6E_{st}(d_h) - 12E_{ad} \quad (20)$$
$$= 2\sqrt{3}\,kd_s^2 - 12E_{ad}$$

With the current form of $E_{st}(d)$ (or more generally, if $E_{st}(d)$ is is convex and monotonically non-decreasing in d, a quite natural assumption for an elastic beam, point forces at the end of the beam give a quadratic strain energy), then the potential energy of the clumped square packed system will be higher than the potential energy of the clumped hexagonal packed system:

$$E_s - E_h = 4E_{st}(d_s) + 4E_{st}(\sqrt{2}\,d_s) - 6E_{st}(d_h) \quad (21)$$
$$= (6 - 2\sqrt{3})kd_s^2 > 0,$$

Thus, the square packed system is more difficult to get into and easier to get out of the clumped configuration. For densely packed nano-fibers 104, nano-fibers 104 are normally in the clumped state. With reference to FIG. 1, square packing will make it easier for interaction with contact surface 108 to break up the clumps and allow nano-fibers 104 to adhere to contact surface 108.

Figure 10A:
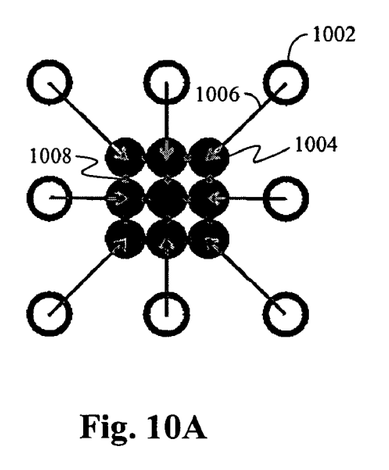
FIG. 10A illustrates the energies involved with joining a small clump in a square lattice configuration.
Figure 10B:
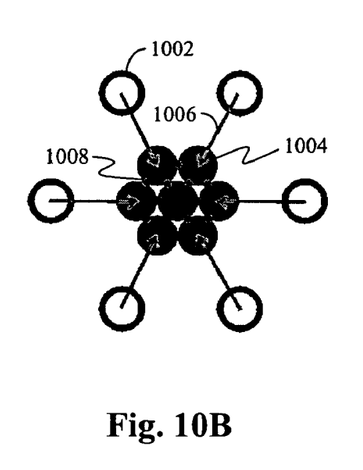
FIG. 10B illustrates the energies involved with joining a small clump in a hexagonal lattice configuration.

FIG. 10A depicts the energies involved with joining a small clump in a square-lattice configuration. FIG. 10B depicts the energies involved with joining a small clump in a hexagonal-lattice configuration. In FIGS. 10A and 10B, locations 1002 correspond to the location of the base of nano-fibers. Locations 1004 correspond to the location of the tips of nano-fibers. Arrows 1006 indicate the distance to join the clump. Dots 1008 indicate contacts made with other nano-fibers.

IV. Interfacial Energy

The interfacial energy per unit length between a pair of contacting nano-fibers, herein referred to as w, can be reasonably estimated by analogy to JKR contact for spheres. (See K. L. Johnson, K. Kendall, A. D. Roberts, Surface Energy and the Contact of Elastic Solids, Proc. Roy. Soc. Lond. A, Vol.

324, pp. 301-313 (1971), which is incorporated herein by reference in its entirety.) Similarly, two parallel cylinders of radius R, Young's modulus E, and Poisson modulus v, will make contact over a finite area even in the absence of an external load as long as a sufficient preload is applied and surface energy, γ, is assumed. The total energy, i.e., the sum of strain and surface energy, per unit length for two cylinders contacting with width 2c along their length, is given by:

$$U = \frac{\pi E}{64(1-v^2)R^2}c^4 - 4\gamma c \quad (22)$$

Solving $$\frac{\partial U}{\partial c} = 0$$

for c* and solving for the interfacial energy w gives:

$$w = -U(c^*) = 12\left(\frac{(1-v^2)R^2\gamma^4}{\pi E}\right)^{\frac{1}{3}} \quad (23)$$

V. Predicted Forces for Adhesive Arrays

With reference to FIG. 1, the center-to-center spacing for nano-fibers 104 is Δ+2R. From this, the density of nano-fibers 104 in a square packed array is:

$$\rho = \frac{1}{(\Delta + 2R)^2}. \quad (24)$$

The density in a hexagonally packed array can be found in a similar fashion. An upper bound on the predicted pulloff forces is given by assuming all nano-fibers 104 in array 102 engage with contact surface 108. This is a loose upper bound, since a small percentage of nano-fibers 104 generally engage. The bound on normal pulloff force for array 102 is given by ρT, where T is given by Equation 5, while the bound on shear pulloff force is ρV, where V is given by equation 7. Specifically, the shear pulloff force of array 102 is:

$$V_{array} = \sqrt{2\pi}\frac{\sqrt{ER^2w}}{(\Delta + 2R)} \quad (25)$$

The ratio of shear to normal remains the same as for the individual hair.

We claim:

1. A fabricated microstructure to adhere in shear to a contact surface, the fabricated microstructure comprising:
   a substrate; and
   a plurality of nano-fibers attached to the substrate,
   wherein the plurality of nano-fibers pack together into one or more clumps of mutually-supporting nano-fibers when not in contact with the contact surface, wherein the clumps break apart when the nano-fibers in the clumps come into contact with the contact surface;
   wherein the nano-fibers have an elasticity modulus E, an interfacial energy per unit length of contact w, a length L, a radius R, and are biased at an angle $\theta_o$ relative to the substrate when the nano-fibers are not clumped together,
   wherein the length L of the nano-fibers is greater than $0.627\theta_o R^2(E/w)^{1/2}$ with $\theta_o$ in radians,
   and wherein each nano-fiber includes a first end attached to the substrate and a free second end opposite the first end, and wherein a portion of the length of the nano-fibers contact the contact surface.

2. The fabricated microstructure of claim 1, wherein the nano-fibers are disposed on the substrate with a linear spacing greater than $0.188(L/R)^2(w/E)^{1/2}$.

3. The fabricated microstructure of claim 2, wherein the angle $\theta_o$ is between 0.35 and 1.22 radians, radius R is between 0.025 μm and 1 μm.

4. The fabricated microstructure of claim 3, wherein the length L of the nano-fiber is greater than 5 microns.

5. The fabricated microstructure of claim 1, wherein the plurality of nano-fibers is disposed on the substrate in a square-lattice configuration.

6. The fabricated microstructure of claim 1, wherein a ratio of the length L to the radius R is equal to a ratio of shear force to normal pull-off force.

7. The fabricated microstructure of claim 6, wherein the ratio of the length L to the radius R is greater than 20 to 1.

8. The fabricated microstructure of claim 1, wherein, when the nano-fibers adhere in shear to the contact surface, the nano-fibers bend and adhere along the portion of their length.

9. The fabricated microstructure of claim 1, wherein the nano-fibers are cylindrical.

10. The fabricated microstructure of claim 1, wherein $\theta_o$ is between 0.35 and 1.22 radians, and wherein the nano-fibers are disposed on the substrate with a linear spacing greater than $0.188(L/R)^2(w/E)^{1/2}$.

11. The fabricated microstructure of claim 1, wherein radius R is between 0.1 μm and 0.3 μm.

12. A fabricated microstructure to adhere in shear to a contact surface, the fabricated microstructure comprising:
    a substrate; and
    a plurality of nano-fibers attached to the substrate,
    wherein the plurality of nano-fibers pack together into one or more clumps of mutually-supporting nano-fibers when not in contact with the contact surface, wherein the clumps break apart when the nano-fibers in the clumps come into contact with the contact surface,
    wherein the nano-fibers have an elasticity modulus E, an interfacial energy per unit length of contact w, a length L, a radius R, and are biased at an angle $\theta_o$ relative to the substrate when the nano-fibers are not clumped together, wherein $\theta_o$ is between 0.35 and 1.22 radians,
    wherein the length L of the nano-fibers is greater than $0.627\theta_o R^2(E/w)^{1/2}$ with $\theta_o$ in radians, wherein each nano-fiber includes a first end attached to the substrate and a free second end opposite the first end, and wherein a portion of the length of the nano-fibers contact the contact surface.

13. The fabricated microstructure of claim 12, wherein the nano-fibers are disposed on the substrate with a linear spacing greater than $0.188(L/R)^2(w/E)^{1/2}$.

14. The fabricated microstructure of claim 13, wherein, radius R is between 0.025 μm and 1 μm, and wherein the length L of the nano-fiber is greater than 5 microns.

15. The fabricated microstructure of claim 12, wherein the plurality of nano-fibers are disposed on the substrate in a square-lattice configuration.

* * * * *